US012803945B2

(12) United States Patent
Jazayeri et al.

(10) Patent No.: US 12,803,945 B2
(45) Date of Patent: Nov. 17, 2026

(54) SYSTEMS AND METHODS FOR STATE SYNCHRONIZATION

(71) Applicant: Meta Platforms, Inc., Menlo Park, CA (US)

(72) Inventors: Vahid Jazayeri, Kirkland, WA (US); Zahan Jagdish Malkani, San Francisco, CA (US); Brian Laphun Tang, San Marino, CA (US); Tuan Nguyen, Woodinville, WA (US); Ryan Edward Huettl, Bothell, WA (US); Yonghua Lin, Bellevue, WA (US); Ritu Dimri, Kirkland, WA (US); Oleksii Khomchenko, Seattle, WA (US); Dharaben Ghodasara, Seattle, WA (US); Evan Feiereisel, Seattle, WA (US); Rama Praveen Pyla, Milpitas, CA (US); Abhishek Srikanth, Fremont, CA (US); Kancheng Zhu, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 618 days.

(21) Appl. No.: 18/048,012

(22) Filed: Oct. 19, 2022

(65) Prior Publication Data

US 2023/0421522 A1 Dec. 28, 2023

Related U.S. Application Data

(60) Provisional application No. 63/355,390, filed on Jun. 24, 2022.

(51) Int. Cl.
*H04L 51/226* (2022.01)

(52) U.S. Cl.
CPC .................................. *H04L 51/226* (2022.05)

(58) Field of Classification Search
CPC . H04L 12/18; H04L 12/1813; H04L 12/1827; H04L 12/1859; H04L 51/10; H04L 51/226; H04L 65/403
See application file for complete search history.

(56) References Cited

U.S. PATENT DOCUMENTS 7,765,266 B2 * 7/2010 Kropivny .............. H04L 51/234 709/219
10,645,181 B2 * 5/2020 Hoffner ................... H04L 67/55
(Continued)

FOREIGN PATENT DOCUMENTS

EP 2355403 A1 * 8/2011 ......... H04L 12/1886

OTHER PUBLICATIONS

Rijpkema et al., "Trade-offs in the design of a router with both guaranteed and best-effort services for networks on chip", Sep. 2003, IEE, IEE Proc.-Comput. Digit. Tech., vol. 150, No. 5, pp. 294-302 (Year: 2003).*
(Continued)

*Primary Examiner* — Kevin L Young
*Assistant Examiner* — Jennifer Marie Gutman
(74) *Attorney, Agent, or Firm* — EVERSHEDS SUTHERLAND (US) LLP

(57) ABSTRACT

A computer-implemented method for state synchronization may include (i) identifying a type of a message from a client device to a server that includes an intended update to content hosted on the server, (ii) determining, based on the type of the message, whether to direct the message to a best-effort publisher-subscriber module or a lossless publisher-subscriber, (iii) directing the message to the best-effort publisher-subscriber module based on the type of the message, (iv) identifying a different type of an additional message from the client device to the server that includes a new intended update to the content, and (v) directing the addi-
(Continued)

tional message to the lossless publisher-subscriber module based on the different type of the additional message. Various other methods, systems, and computer-readable media are also disclosed.

14 Claims, 4 Drawing Sheets

(56) References Cited

U.S. PATENT DOCUMENTS

| | | | | |
|---|---|---|---|---|
| 2002/0138582 | A1* | 9/2002 | Chandra | G06Q 10/107 709/206 |
| 2005/0044151 | A1* | 2/2005 | Jiang | G06F 9/546 709/206 |
| 2006/0101089 | A1* | 5/2006 | Parr | G06F 16/20 |
| 2006/0149840 | A1* | 7/2006 | Thompson | H04L 45/24 709/224 |
| 2006/0248145 | A1* | 11/2006 | Karmakar | H04L 69/161 709/206 |
| 2008/0127208 | A1* | 5/2008 | Bedi | G06F 11/008 719/313 |
| 2008/0127209 | A1* | 5/2008 | Gale | G06F 9/546 719/313 |
| 2010/0017441 | A1* | 1/2010 | Todd | G06Q 10/0635 707/E17.005 |
| 2010/0274848 | A1* | 10/2010 | Altmaier | H04L 67/14 709/228 |
| 2013/0036427 | A1* | 2/2013 | Chen | G06F 9/546 719/312 |
| 2016/0021614 | A1* | 1/2016 | Liu | H04L 51/04 370/311 |
| 2016/0127300 | A1* | 5/2016 | Granshaw | H04L 51/226 709/206 |
| 2018/0241818 | A1* | 8/2018 | Baptist | G06F 12/0802 |
| 2019/0052727 | A1* | 2/2019 | Banks | G06F 9/54 |
| 2021/0049827 | A1* | 2/2021 | Lebaredian | G06T 19/20 |
| 2021/0216380 | A1* | 7/2021 | Ponnuswamy | G06F 16/2379 |

OTHER PUBLICATIONS

Malekpour et al., "End-to-End Congestion Control for Content-Based Networks", 2014, IEEE, 2014 IEEE 33rd International Symposium on Reliable Distributed Systems, pp. 221-231 (Year: 2014).*

* cited by examiner

SYSTEMS AND METHODS FOR STATE SYNCHRONIZATION

CROSS REFERENCE TO RELATED APPLICATION

This application claims the benefit of U.S. Provisional Application No. 63/355,390, filed Jun. 24, 2022, the disclosures of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
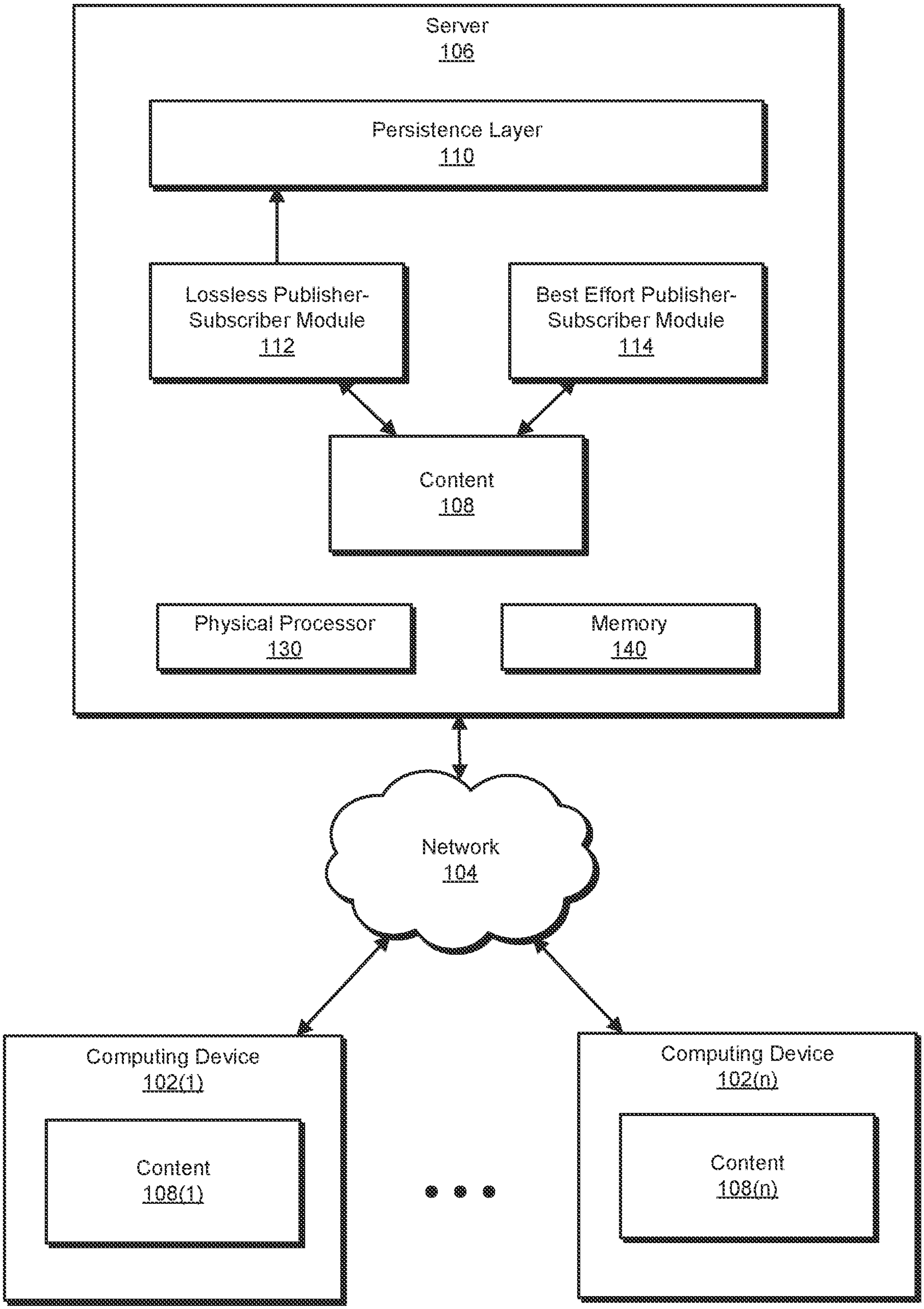
FIG. 1 is a block diagram of an exemplary system for state synchronization.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

The present disclosure is generally directed to updating content hosted on a server and downloaded by multiple clients in a reliable and efficient manner. In some embodiments, content synchronization may be accomplished via a publisher-subscriber module on a server that accepts messages from publishers and then forwards those messages to subscribers. In cases where clients can both view and edit content, such as forum postings, comments on articles, shared digital rooms, and so forth, a client may be both a publisher and a subscriber. Some publisher-subscriber modules may store each message to a persistence layer, improving reliability at the cost of increasing latency. In order to improve latency while maintaining reliability, the systems described herein may include two publisher-subscriber modules: a lossless module that stores messages to a persistence layer and a best-effort module that does not. By directing different types of messages to the appropriate module, the systems described herein may ensure that critical messages are not lost while reducing latency for other types of messages, thereby reducing latency for the system as a whole.

In some embodiments, the systems described herein may improve the functioning of a computing device by facilitating communication and/or collaboration via the computing device. Additionally, the systems described herein may improve the fields of online collaboration and/or digital rooms by improving the consistency and latency of digital multimedia rooms.

In some embodiments, the systems described herein may be used to maintain state synchronization for content transmitted between multiple clients and a server. FIG. 1 is a block diagram of an exemplary system 100 for state synchronization for content hosted on a server and accessible via clients. In one embodiment, and as will be described in greater detail below, a server 106 may be configured with content 108. In some embodiments, server 106 may communicate with various computing devices 102(1)-(*n*) (e.g., via a network 104) that each host an instance of content 108(1)-(*n*). In one embodiment, server 106 may be configured with a lossless publisher-subscriber module 112 and/or a best-effort publisher-subscriber module 114 that receive messages from computing devices 102(1)-(*n*) indicating changes to the state of content 108, publish those changes to content 108, and/or forward information about the changes to content 108 to computing devices 102(1)-(*n*). In one embodiment, lossless publisher-subscriber module 112 may save message data to a persistence layer 110 while best-effort publisher-subscriber module 114 may not save message data to persistence layer 110.

Server 106 generally represents any type or form of backend computing device that may host a digital content. Examples of server 106 may include, without limitation, application servers, database servers, and/or any other relevant type of server. Although illustrated as a single entity in FIG. 1, server 106 may include and/or represent a group of multiple servers that operate in conjunction with one another.

Computing devices 102(1)-(*n*) generally represent any type or form of computing device capable of reading computer-executable instructions. For example, computing devices 102(1)-(*n*) may represent mobile devices such as smart phones. Additional examples of a computing device may include, without limitation, a laptop, a desktop, a wearable device, a smart device, an artificial reality device, a personal digital assistant (PDA), etc.

Content 108 generally represents any type of digital content that is posted, edited, uploaded, and/or viewed by users. In some embodiments, content 108 may include text, images, audio, and/or video. Examples of content 108 may include, without limitation, forum posts, comments, and/or instant messages.

In some embodiments, content 108 may include the contents of a digital container. A digital container generally refers to any type or form of digital object that (a) enables synchronous interaction between multiple users, (b) persists in between active user sessions, and (c) is capable of storing objects of multiple types of digital media. In some embodiments, a digital container may have multiple instances that are kept synchronized by the systems described herein. For example, there may be one or more instance of a digital container on a server as well as an instance of the digital container hosted on each personal computing device that a user is using to interact with the digital container. In some examples, a digital container may be referred to as a digital room (e.g., a persistent digital multimedia room).

The systems described herein may enable many types of synchronous interaction that takes place at the same time and is synchronized across multiple computing devices such that the devices update the state of content 108 in real time or close to real time (e.g., within several milliseconds or several seconds). For example, if one user rotates an object within a digital container via their personal computing device, the systems described herein may synchronize all instances of the digital container to show the rotated object.

Persistence layer 110 generally represents any type or form of data storage capable of storing snapshots, backups, and/or other information that can be used to reconstruct the state of digital content at a given time. In some embodiments, persistence layer 110 may include physical and/or virtual memory. In one embodiment, persistence layer 110 may include a database. In some embodiments, persistence layer 110 may receive data from one or more publisher-subscriber modules, such as lossless publisher-subscriber module 112.

A publisher-subscriber module is any type of software and/or hardware module that receives messages from publishers (e.g., client devices) and forwards those messages to subscribers (e.g., the same and/or additional client devices). Lossless publisher-subscriber module 112 may generally represent any type of publisher-subscriber module that saves content to a persistence layer. For example, lossless publisher-subscriber module 112 may send messages to persistence layer 110. In some embodiments, a lossless publisher-subscriber module may receive a confirmation of each update from a client before sending the next update, ensuring that the client does not miss any updates and that the client can be efficiently updated from the most recent snapshot when necessary. In one embodiment, the systems described herein may send all object creation and/or deletion via a lossless publisher-subscriber module.

Best-effort publisher-subscriber module 114 generally represents any type of publisher-subscriber module that receives data from one or more clients and sends this data to one or more clients without saving the data to a persistence layer and/or requiring confirmation that the data has been received. In some examples, by skipping these data processing steps, a best-effort publisher-subscriber module may have lower latency than a lossless publisher-subscriber module processing the same data. In one embodiment, the systems described herein may send all messages related to moving objects, resizing objects, and/or freeform drawings via a best-effort publisher-subscriber module.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of the modules illustrated in FIG. 1. Examples of memory include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of the modules stored in memory 140. Additionally or alternatively, a physical processor may execute one or more modules. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
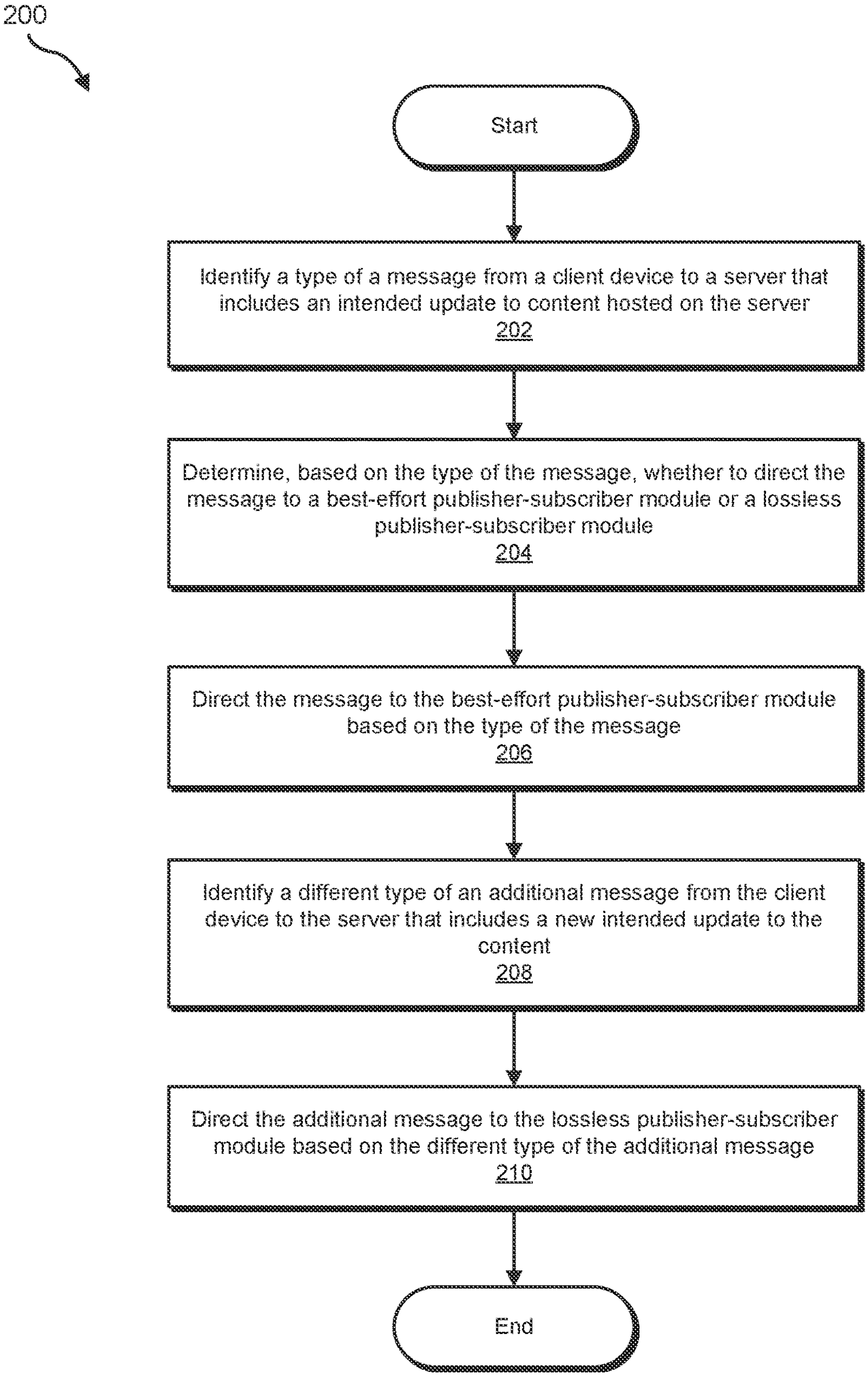
FIG. 2 is a flow diagram of an exemplary method for state synchronization.

FIG. 2 is a flow diagram of an exemplary method 200 for updating content via a pair of publisher-subscriber modules. In some embodiments, each step of method 200 may be performed on a client device (e.g., any or all of computing devices 102(1)-(*n*) in FIG. 1) while in other embodiments, each step of method 200 may be performed on a server (e.g., server 106 in FIG. 1). In some examples, at step 202, the systems described herein may identify a type of a message from a client device to a server that includes an intended update to content hosted on the server.

The systems described herein may identify the type of message in a variety of ways/contexts. In some embodiments, the client device may identify the type of message. Additionally or alternatively, the server may identify the type of message. In one example, the systems described herein may identify a message that includes a comment on a media item (e.g., a video, image, social media post, etc.). In some examples, the intended update may include text. Additionally or alternatively, the intended update may include visual data, such as a freeform line drawn by a user via a drawing interface. In some embodiments, the intended update may be directed towards content that is visible to multiple users (e.g., content that is public and/or visible to a predetermined group of users such as in a group chat).

Figure 3:
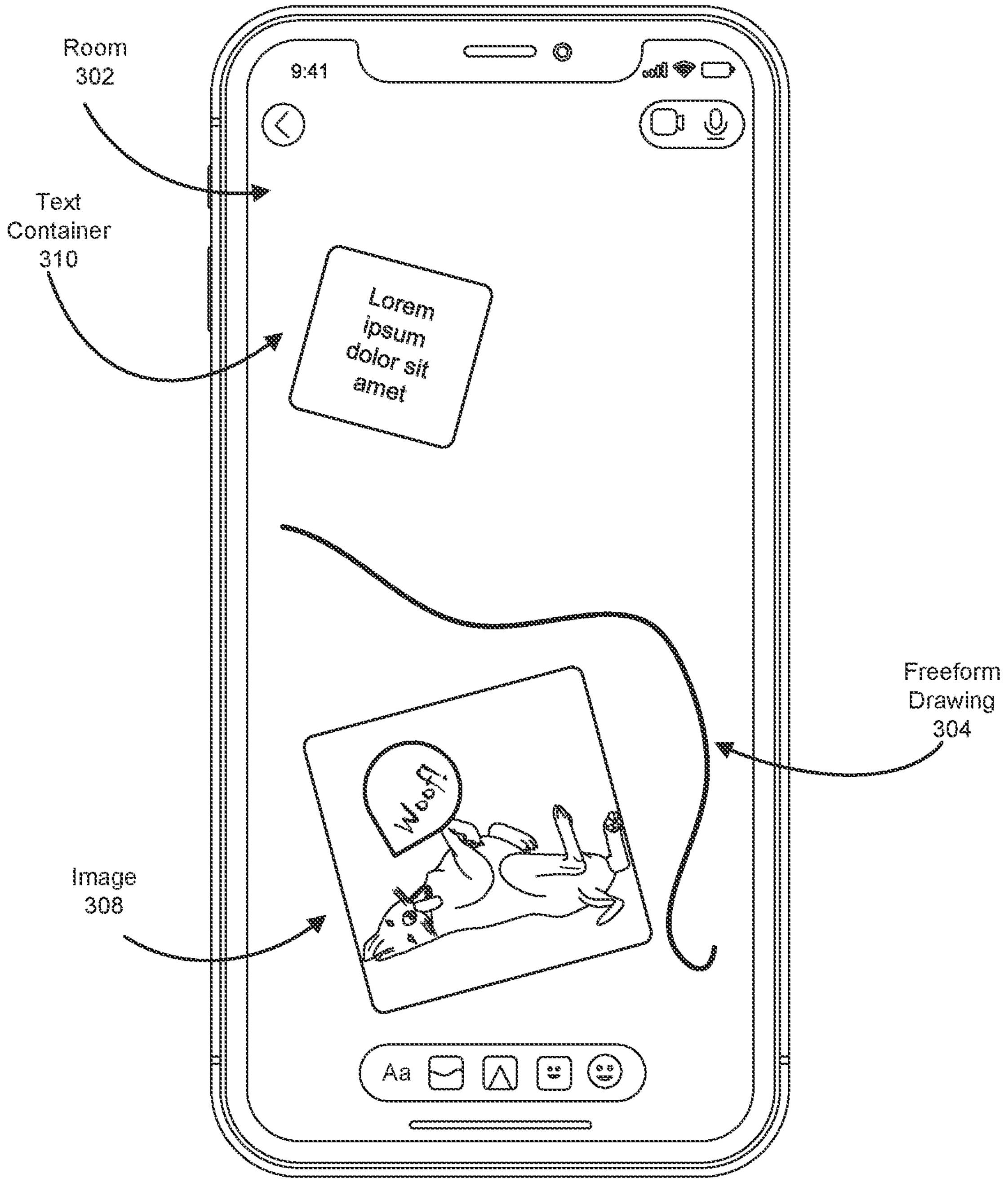
FIG. 3 is an illustration of exemplary content for a state synchronization method.

In one embodiment, as is illustrated in FIG. 3, the intended update may be directed to content in a digital container such as a persistent digital multimedia room that facilitates synchronous communication between two or more users. For example, the content may include an update to a freeform drawing 304, an image 308, and/or a text container 310, in a room 302. In some examples, content in room 302 may be visible to multiple users that are each interacting with room 302 via a different client device. In one embodiment, the systems described herein may store data on a server that represents data in room 302 currently visible to each client device interacting with room 302. In some embodiments, a server may store a separate instance of the data for each client.

Returning to FIG. 2, at step 204, the systems described herein may determine, based on the type of the message, whether to direct the message to a best-effort publisher-subscriber module or a lossless publisher-subscriber module.

The systems described herein may determine where to direct messages to the different publisher-subscriber modules in a variety of ways and/or contexts. In some examples, the systems described herein may direct single-message updates (e.g., content updates contained within a single message with no further messages expected) to the lossless publisher-subscriber module and/or multi-message updates (e.g., content updates only partially contained within a single message with further messages expected) to the best-effort publisher-subscriber module.

For example, the systems described herein may direct an image creation update that contains the entire image within one message to the lossless publisher-subscriber module while directing an image rotation update that contains only a fraction of the expected total rotation of the image within a single message to the best-effort publisher-subscriber module. In this example, the systems described herein may determine that the intended update within the message (e.g., the image rotation data) includes a portion of a multi-message update that is expected to span multiple additional messages (e.g., additional image rotation data as the user continues to rotate the image) and in response may direct the message to the best-effort publisher-subscriber module. Similarly, the systems described herein may direct the image creation message to the lossless publisher-subscriber module based on the type of the additional message by determining that the intended update within the message includes a complete update contained in the message that is not expected to span any additional messages. In some embodiments, the systems described herein may send the complete content of the multi-message update to the lossless publisher-subscriber module in response to determining that the best-effort publisher-subscriber module has received the last message of the multi-message update and is not expecting further additional messages with content for the multi-message update.

In one example, the systems described herein may always direct messages containing exclusively text content to the lossless publisher-subscriber module. In another example, the systems described herein may always direct messages that include single-pixel updates to drawing objects to the best-effort publisher-subscriber module. For example, returning to FIG. 3, the systems described herein may direct an update to the content of text container 310 to the lossless publisher-subscriber module. However, if the systems described herein receive an update indicating that image 308 is being resized, the systems described herein may send that update to the best-effort publisher-subscriber module and may not send an update to the lossless publisher-subscriber module until the resizing is complete. In this example, a user who joins partway through the resizing may not see image 308 slowly change size but may see image 308 suddenly jump to the final size once the resizing is complete.

In one embodiment, a client may direct messages to a particular publisher-subscriber module by including a flag in the messages indicating the selected module. For example, a client may include a flag in an image resizing updating indicating that the image resizing is complete and the server should process the message via the lossless publisher-subscriber module. In some embodiments, a server may direct messages to a particular publisher-subscriber module by reading a flag in the messages sent by the client. For example, a server may scan each message for a flag indicating the client's suggested publisher-subscriber module and direct each message to the suggested module. Additionally or alternatively, a server may direct messages to a particular module based on analyzing the content and/or type of the message. For example, a server may determine that a message contains a text update and may direct the message to the lossless publisher-subscriber module based on the type of the update.

Returning to FIG. 2, at step 206, the systems described herein may direct the message to the best-effort publisher-subscriber module based on the type of the message. At step 208, the systems described herein may identify a different type of an additional message from the client device to the server that includes a new intended update to the content. At step 210, the systems described herein may direct the additional message to the lossless publisher-subscriber module based on the different type of the additional message.

Figure 4:
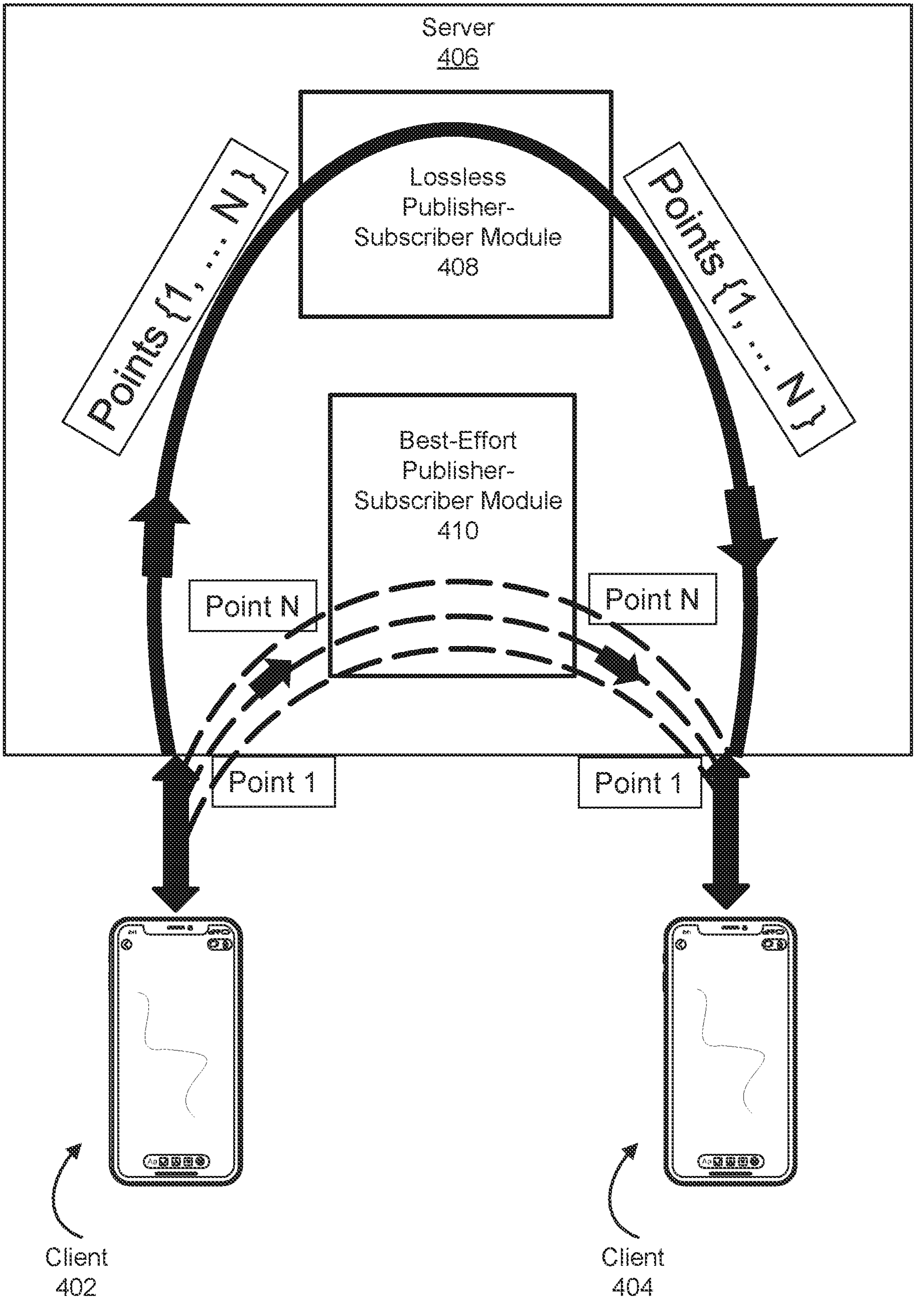
FIG. 4 is an illustration of an exemplary system for state synchronization.

The systems described herein may direct different messages to different publisher-subscriber modules in a variety of ways and/or contexts. For example, as illustrated in FIG. 4, a server 406 may receive a message from a client 402 that includes a single pixel of a line being drawn via client 402. In one embodiment, the systems described herein may direct this message to a best-effort publisher-subscriber module 410. In some examples, a client 404 may download the new content from server 406 as the new content is processed. In one example, the systems described herein may continue sending each single pixel message through best-effort publisher-subscriber module 410 until the line drawing is completed (e.g., based on detecting that a user has removed their finger from the touch screen of client 402). In one example, a new client that gains access to the content halfway through the drawing of the line will not immediately see the first half of the line but will see the second half of the line as it is drawn, because none of the line has yet been saved to a persistence layer. In one embodiment, once the line drawing is completed, the systems described herein may direct a message that contains all pixels of the line to a lossless publisher-subscriber module 408 that saves this information to a persistence layer. Any client that receives an update from the persistence layer (e.g., in response to joining the session and/or refreshing active content) will receive the entire line.

In some embodiments, the system subscribed here in may include a server-side compute platform that stores data reflecting the state of the content on each client device that has access to the content. In one embodiment, this compute platform may host a bidirectional data stream and/or have long-lived sessions. In some examples, each instance of the compute platform may store a cached map of the location of each other instance of the compute platform for this particular content, removing the need for a publisher-subscriber module to look up the data location with each data update.

As described above, the systems and methods described herein may improve shared communication on a computing device by reducing the latency of a publisher-subscriber system without sacrificing reliability. By directing parts of multi-part messages and other less critical messages to a best-effort publisher-subscriber module while directing completed updates to a lossless publisher-subscriber module, the systems described herein may avoid unnecessary trips to a persistence layer and the resulting increased latency without risking meaningful data loss.

Example 1: A method for state synchronization may include (i) identifying a type of a message from a client device to a server that includes an intended update to content hosted on the server, (ii) determining, based on the type of the message, whether to direct the message to a best-effort publisher-subscriber module or a lossless publisher-subscriber, (iii) directing the message to the best-effort publisher-subscriber module based on the type of the message, (iv) identifying a different type of an additional message from the client device to the server that includes a new intended update to the content, and (v) directing the additional message to the lossless publisher-subscriber module based on the different type of the additional message.

Example 2: The computer-implemented method of example 1, where directing the message to the best-effort publisher-subscriber module based on the type of the message includes determining that the intended update within the message includes a portion of a multi-message update that is expected to span multiple additional messages.

Example 3: The computer-implemented method of examples 1-2 may further include sending complete content of the multi-message update to the lossless publisher-subscriber module in response to determining that the best-effort publisher-subscriber module has received the last message of the multi-message update and is not expecting further additional messages with content for the multi-message update.

Example 4: The computer-implemented method of examples 1-3, where directing the additional message to the lossless publisher-subscriber module based on the different type of the additional message includes determining that the new intended update within the additional message includes a complete update contained in the additional message that is not expected to span any additional messages.

Example 5: The computer-implemented method of examples 1-4, where each step of the method is performed by the client device.

Example 6: The computer-implemented method of examples 1-5, where each step of the method is performed by the server.

Example 7: The computer-implemented method of examples 1-6, where the content hosted on the server includes content of a persistent digital multimedia room.

Example 8: The computer-implemented method of examples 1-7 may further include sending, by the lossless publisher-subscriber module, the additional message to the persistence layer.

Example 9: A system for state synchronization may include at least one physical processor and physical memory including computer-executable instructions that, when executed by the physical processor, cause the physical processor to (i) identify a type of a message from a client device to a server that includes an intended update to content hosted on the server, (ii) determine, based on the type of the message, whether to direct the message to a best-effort publisher-subscriber module or a lossless publisher-subscriber, (iii) direct the message to the best-effort publisher-subscriber module based on the type of the message, (iv) identify a different type of an additional message from the client device to the server that includes a new intended update to the content, and (v) direct the additional message to the lossless publisher-subscriber module based on the different type of the additional message.

Example 10: The system of example 9, where directing the message to the best-effort publisher-subscriber module based on the type of the message includes determining that the intended update within the message includes a portion of a multi-message update that is expected to span multiple additional messages.

Example 11: The system of examples 9-10, where the computer-executable cause the physical processor to send complete content of the multi-message update to the lossless publisher-subscriber module in response to determining that the best-effort publisher-subscriber module has received the last message of the multi-message update and is not expecting further additional messages with content for the multi-message update.

Example 12: The system of examples 9-11, where directing the additional message to the lossless publisher-subscriber module based on the different type of the additional message includes determining that the new intended update within the additional message includes a complete update contained in the additional message that is not expected to span any additional messages.

Example 13: The system of examples 9-12, where the physical processor is housed on the client device.

Example 14: The system of example 9-13, where the physical processor is housed on the server.

Example 15: The system of example 9-14, where the content hosted on the server includes content of a persistent digital multimedia room.

Example 16: The system of examples 9-15, where the computer-executable cause the physical processor to send, by the loss-less publisher-subscriber module, the additional message to the persistence layer.

Example 17: A non-transitory computer-readable medium may include one or more computer-readable instructions that, when executed by at least one processor of a computing device, cause the computing device to (i) identify a type of a message from a client device to a server that includes an intended update to content hosted on the server, (ii) determine, based on the type of the message, whether to direct the message to a best-effort publisher-subscriber module or a lossless publisher-subscriber, (iii) direct the message to the best-effort publisher-subscriber module based on the type of the message, (iv) identify a different type of an additional message from the client device to the server that includes a new intended update to the content, and (v) direct the additional message to the lossless publisher-subscriber module based on the different type of the additional message.

Example 18: The non-transitory computer-readable medium of example 17, where directing the message to the best-effort publisher-subscriber module based on the type of the message includes determining that the intended update within the message includes a portion of a multi-message update that is expected to span multiple additional messages.

Example 19: The non-transitory computer-readable medium of examples 17-18, where the computer-readable cause the computing device to send complete content of the multi-message update to the lossless publisher-subscriber module in response to determining that the best-effort publisher-subscriber module has received the last message of the multi-message update and is not expecting further additional messages with content for the multi-message update.

Example 20: The non-transitory computer-readable medium of examples 17-19, where directing the additional message to the lossless publisher-subscriber module based on the different type of the additional message includes determining that the new intended update within the additional message includes a complete update contained in the additional message that is not expected to span any additional messages.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data within a persistent digital multimedia room, output a result of the transformation to update a persistent digital multimedia room, use the result of the transformation to update a persistent digital multimedia room, and store the result of the transformation to a persistent digital multimedia room. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:

determining a type of a message from a client device to a server comprising an intended update to content hosted on the server, wherein the intended update comprises a portion of a multi-message update, and wherein the multi-message update corresponds to a single modification of the content that is expected to span multiple additional messages;

determining, based on the type of the message, whether to direct the message to (i) a best effort publisher-subscriber module that processes messages with low latency but does not store the messages to a persistence layer, or (ii) a lossless publisher-subscriber module that processes the messages with a higher latency but does store the messages to the persistence layer;

directing the message to the best-effort publisher-subscriber module based at least in part on the intended update comprising the portion of the multi-message update;

determining that the multi-message update is complete based at least in part on the best-effort publisher-subscriber receiving all messages corresponding to the single modification of the content;

in response to determining that the multi-message update is complete, sending complete content corresponding to the multi-message update to the lossless publisher-subscriber module;

determining a different type of an additional message from the client device to the server comprising a new intended update to the content, wherein the new intended update comprises a text update;

determining that the different type of the additional message is associated with the lossless publisher-subscriber module; and directing the additional message to the lossless publisher-subscriber module.

2. The computer-implemented method of claim 1, wherein directing the additional message to the lossless publisher-subscriber module based on the different type of the additional message comprises determining that the new intended update within the additional message comprises a complete update contained in the additional message that is not expected to span any additional messages.

3. The computer-implemented method of claim 1, wherein each step of the method is performed by the client device.

4. The computer-implemented method of claim 1, wherein each step of the method is performed by the server.

5. The computer-implemented method of claim 1, wherein the content hosted on the server comprises content of a persistent digital multimedia room.

6. The computer-implemented method of claim 1, further comprising sending, by the lossless publisher-subscriber module, the additional message to the persistence layer.

7. A system comprising:

at least one physical processor;

physical memory comprising computer-executable instructions that, when executed by the physical processor, cause the physical processor to:

determine a type of a message from a client device to a server comprising an intended update to content hosted on the server, wherein the intended update comprises a portion of a multi-message update, and wherein the multi-message update corresponds to a single modification of the content that is expected to span multiple additional messages;

determine, based on the type of the message, whether to direct the message to (i) a best-effort publisher-subscriber module that processes messages with low latency but does not store the messages to a persistence layer, or (ii) a lossless publisher-subscriber module that processes the messages with a higher latency but does store the messages to the persistence layer;

direct the message to the best-effort publisher-subscriber module based at least in part on the intended update comprising the portion of the multi-message update;

determine that the multi-message update is complete based at least in part on the best-effort publisher-subscriber receiving all messages corresponding to the single modification of the content;

in response to determining that the multi-message update is complete, send complete content corresponding to the multi-message update to the lossless publisher-subscriber module;

determine a different type of an additional message from the client device to the server comprising a new intended update to the content, wherein the new intended update comprises a text update;

determine that the different type of the additional message is associated with the lossless publisher-subscriber module; and direct the additional message to the lossless publisher-subscriber module.

8. The system of claim 7, wherein directing the additional message to the lossless publisher-subscriber module based on the different type of the additional message comprises determining that the new intended update within the additional message comprises a complete update contained in the additional message that is not expected to span any additional messages.

9. The system of claim 7, wherein the physical processor is housed on the client device.

10. The system of claim 7, wherein the physical processor is housed on the server.

11. The system of claim 7, wherein the content hosted on the server comprises content of a persistent digital multimedia room.

12. The system of claim 7, wherein the computer-executable instructions cause the physical processor to send, by the lossless publisher-subscriber module, the additional message to the persistence layer.

13. A non-transitory computer-readable medium comprising one or more computer-readable instructions that, when executed by at least one processor of a computing device, cause the computing device to:

determine a type of a message from a client device to a server comprising an intended update to content hosted on the server, wherein the intended update comprises a portion of a multi-message update, and wherein the multi-message update corresponds to a single modification of the content that is expected to span multiple additional messages;

determine, based on the type of the message, whether to direct the message to (i) a best effort publisher-subscriber module that processes messages with low latency but does not store the messages to a persistence layer, or (ii) a lossless publisher-subscriber module that processes the messages with a higher latency but does store the messages to the persistence layer;

direct the message to the best-effort publisher-subscriber module based at least in part on the intended update comprising the portion of the multi-message update;

determining that the multi-message update is complete based at least in part on the best-effort publisher-subscriber receiving all messages corresponding to the single modification of the content;

in response to determining that the multi-message update is complete, sending complete content corresponding to the multi-message update to the lossless publisher-subscriber module;

determine a different type of an additional message from the client device to the server comprising a new intended update to the content, wherein the new intended update comprises a text update;

determine that the different type of the additional message is associated with the lossless publisher-subscriber module; and direct the additional message to the lossless publisher-subscriber module.

14. The non-transitory computer-readable medium of claim 13, wherein directing the additional message to the lossless publisher-subscriber module based on the different type of the additional message comprises determining that the new intended update within the additional message comprises a complete update contained in the additional message that is not expected to span any additional messages.

* * * * *